United States Patent
Prasad et al.

(10) Patent No.: US 8,216,517 B2
(45) Date of Patent: Jul. 10, 2012

(54) SYSTEM AND METHOD FOR MONITORING AN INTEGRATED SYSTEM

(75) Inventors: Vijaysai Prasad, Bangalore (IN); Amol Rajaram Kolwalkar, Bangalore (IN); Sunil Shirish Shah, Bangalore (IN); Frederick Liberatore, Carlsbad, CA (US); Rajendra Naik, Bangalore (IN)

(73) Assignee: General Electric Company, Niskayuna, NY (US)

( * ) Notice: Subject to any disclaimer, the term of this patent is extended or adjusted under 35 U.S.C. 154(b) by 596 days.

(21) Appl. No.: 12/414,092

(22) Filed: Mar. 30, 2009

(65) Prior Publication Data

US 2010/0243564 A1 Sep. 30, 2010

(51) Int. Cl.
*G01N 15/06* (2006.01)
*C02F 3/00* (2006.01)

(52) U.S. Cl. ........... 422/79; 422/62; 422/68.1; 422/509; 422/105; 210/614; 210/739

(58) Field of Classification Search .................. 700/266; 422/62, 307, 68.1, 79, 509, 105; 210/614, 210/739
See application file for complete search history.

(56) References Cited

U.S. PATENT DOCUMENTS

| | | | | |
|---|---|---|---|---|
| 776,145 A * | 11/1904 | Potter | ........................... | 209/164 |
| 3,622,002 A * | 11/1971 | Kirk | ............................... | 210/105 |
| 4,986,916 A * | 1/1991 | Hickey | ........................... | 210/603 |
| 5,060,132 A * | 10/1991 | Beller et al. | ................... | 700/38 |
| 5,505,843 A * | 4/1996 | Obuchi et al. | ................... | 210/94 |
| 5,540,840 A * | 7/1996 | Heitkamp et al. | ........... | 210/617 |
| 5,989,428 A * | 11/1999 | Goronszy | ...................... | 210/605 |
| 6,296,766 B1 * | 10/2001 | Breckenridge | ............... | 210/613 |
| 6,408,227 B1 | 6/2002 | Singhvi et al. | | |
| 6,723,286 B2 * | 4/2004 | Sakairi et al. | ................... | 422/62 |
| 7,001,519 B2 * | 2/2006 | Linden et al. | ................. | 210/602 |
| 7,008,538 B2 * | 3/2006 | Kasparian et al. | ........... | 210/610 |
| 7,014,777 B2 * | 3/2006 | Ishikawa et al. | ............. | 210/739 |
| 7,231,323 B2 * | 6/2007 | Weinberg et al. | ........... | 702/188 |
| 7,332,093 B2 * | 2/2008 | Rosen et al. | ................. | 210/739 |
| 7,481,940 B2 * | 1/2009 | Clifford et al. | ............... | 210/739 |
| 8,038,938 B2 * | 10/2011 | Cabello et al. | .................. | 422/24 |
| 2002/0130089 A1 * | 9/2002 | Temple et al. | ................ | 210/727 |
| 2004/0011736 A1 * | 1/2004 | Ishikawa et al. | .............. | 210/614 |
| 2005/0061737 A1 * | 3/2005 | Linden et al. | ................. | 210/602 |
| 2005/0191753 A1 * | 9/2005 | Kalia et al. | ...................... | 436/62 |
| 2005/0274467 A1 * | 12/2005 | Lawrence et al. | .............. | 162/49 |
| 2006/0113242 A1 * | 6/2006 | Ishikawa et al. | ............. | 210/601 |
| 2006/0131232 A1 * | 6/2006 | Rosen et al. | ................. | 210/614 |
| 2007/0023710 A1 * | 2/2007 | Tom et al. | ................. | 250/504 R |

(Continued)

OTHER PUBLICATIONS

M. Dixon, J.R. Gallop, S.C. Lambert, J V Healy; "Experience With Data Mining for the Anaerobic Wastewater Treatment Process";Environmental Modelling & Software 22 (2007) 315-322.

(Continued)

*Primary Examiner* — Brian R Gordon
(74) *Attorney, Agent, or Firm* — Mary Louise Gioeni (57) ABSTRACT

A control system includes an estimator configured to determine a present state of a device and compare the present state of the device with an expected state of the device. The control system further includes a predictor operatively coupled to the estimator, and configured to predict an event for execution by the device to reach the expected state of the device. The control system also includes a supervisory control unit operatively coupled to the predictor and the device, and configured to facilitate execution of the predicted event by the device.

16 Claims, 7 Drawing Sheets

U.S. PATENT DOCUMENTS

| | | | |
|---|---|---|---|
| 2007/0221552 A1* | 9/2007 | Denney | 210/85 |
| 2007/0292308 A1* | 12/2007 | Horan et al. | 422/63 |
| 2008/0028675 A1* | 2/2008 | Clifford et al. | 44/605 |
| 2008/0311640 A1* | 12/2008 | Cox et al. | 435/168 |
| 2010/0096339 A1* | 4/2010 | Newcombe et al. | 210/744 |
| 2010/0193430 A1* | 8/2010 | Whiteman | 210/610 |

OTHER PUBLICATIONS

Julian Gallop, Simon Lambert, Maurice Dixon, Jerome Healy, Laurent Lardon, Jean-Phillipe Steyer; "The Use of Data Mining for the Monitoring and Control of Anaerobic Waste Water Treatment Plant"; CCLRC Rutherford Appleton laboratory; EAML Workshop Sep. 2004; 22 Pages.

* cited by examiner

SYSTEM AND METHOD FOR MONITORING AN INTEGRATED SYSTEM

BACKGROUND

The invention relates generally to a control system, and more particularly to a control system and method for monitoring an integrated system and predicting events leading to an expected state of the integrated system.

Soaring fuel prices and shrinking water resources together with emerging global norms for conservation of water and energy are forcing industries to manage their power and water utilization more efficiently. Thus, industries are identifying ways to attain a significant reduction in fossil-fuel based power consumption and fresh water intake. One promising technology that enables significant reduction in power consumption and fresh water intake includes an integrated system having a water purification unit and a power generation unit. The power generation unit utilizes waste from the water purification unit to generate electrical power, and the integrated system operates on the electrical power generated by the power generation unit. Moreover, after meeting the power requirements of the integrated system, excess power is used for some other application. An example of the integrated system is General Electric waste-to-value system that generates electricity and process steam (heat) in a flexible manner while recovering potable high-quality water.

Typically, key units or components of a water purification system include a digester and a membrane bioreactor, while a key unit of a power generation system is a reciprocating gas engine or the like. The water purification system releases biogas as a waste that is consumed by the reciprocating gas engine to generate electrical power. Further, the key units of the water purification system operate in a coordinated and an interdependent fashion, hence any upsets or variations in any key unit affect functionality and performance of the rest of the key units. The wastewater feed stream to the digester, for example, may have significant variations in flowrates, influent chemical oxygen demand, total suspended solids, total dissolved solids, temperature, nitrogen, phosphorous, sulphates and pH. The variations in the digester, in turn, impact operation of downstream process units, such as the membrane bioreactor. Moreover, performance variations in the water purification unit may result in significant variations in flowrate, composition and heating value of the biogas resulting in tripping of the gas engine, ultimately resulting in upset and shutdown of the integrated system.

Conventionally, the variations in the key units are monitored by laboratory tests. Unfortunately, these lab tests are time consuming and are not sufficient for stopping frequent upsets of the integrated system leading to large dead time enclosed loop responses. Also, the operator of the integrated system is unable to detect any anomalous behavior of the integrated system until it is too late, thereby causing costly shutdowns and maintenance. Thus, due to absence of a realtime or near realtime monitoring process, the significant variations in the input feed cannot be monitored leading to expensive shutdowns of the integrated system.

It is therefore desirable to achieve robust and stable operation of the overall integrated system over long continuous periods of operation in the presence of wide-ranging variations. Further, it is desirable to have a realtime monitoring and control system configured to predict significant variations and disturbances in the integrated system well in advance, and take subsequent corrective actions to prevent the integrated system from stress leading to shutdowns.

BRIEF DESCRIPTION

Briefly in accordance with one aspect of the technique a control system is provided. The control system includes an estimator configured to determine a present state of a device and compare the present state of the device with an expected state of the device. The control system also includes a predictor operatively coupled to the estimator, and configured to predict an event for execution by the device to reach the expected state of the device. The control system further includes a supervisory control unit operatively coupled to the predictor and the device, and configured to facilitate execution of the predicted event by the device.

In accordance with a further aspect of the present technique, a method for monitoring and controlling a device is provided. The method includes determining a present state of a device utilizing system parameters, comparing the present state of the device with an expected state of the device to determine a difference between the present state of the device and the expected state of the device, predicting an event utilizing the difference between the present state of the device and the expected state of the device to reach the expected state of the device, and executing the predicted event to reach the expected state of the device.

In accordance with a further aspect of the present technique, a method for monitoring and controlling a device is provided. The method includes determining a realtime chemical oxygen demand of a feed stream of the device using a realtime total organic carbon and color of the feed stream, determining realtime parameters of the feed stream of the device, determining system parameters by applying one or more estimation techniques to the realtime parameters, predetermined parameters, offline parameters and the realtime chemical oxygen demand, determining a present state of the device utilizing the system parameters, comparing the present state of the device with an expected state of the device to determine a difference between the present state of the device and the expected state of the device, and predicting an event utilizing the difference between the present state of the device and the expected state of the device to reach the expected state of the device.

In accordance with a further aspect of the present technique, a control system for monitoring and controlling a digester is provided. The system comprises an estimator configured to determine a present state of the digester. The estimator is further configured to compare the present state of the digester with an expected state of the digester. The system further includes a predictor operatively coupled to the estimator that is configured to predict an event for execution by the digester to reach the expected state of the digester. The system further includes a supervisory control unit operatively coupled to the predictor and the digester, and configured to facilitate execution of the predicted event by the digester.

In accordance with a further aspect of the present technique, a system is provided. The system includes a water purification system and a control system. The water purification system includes a digester configured to extract substantial amounts of chemical oxygen demand from impure wastewater to generate chemical oxygen demand cleared water, one or more sensing devices operatively associated with the digester, and configured to sense realtime total organic carbon and realtime parameters of a feed stream of the digester. The water purification system further includes a membrane bioreactor operatively associated with the digester, and configured to generate an effluent by removal of substantial amounts of suspended impurities and any remaining chemical oxygen demand from the chemical oxygen demand cleared water. The water purification unit further includes a reverse osmosis unit operatively associated with the membrane bioreactor, and configured to remove soluble organics and total dissolved solids from the effluent. The control system is in operative association with the water purification system, and includes an estimator configured to determine a present state of the water purification system utilizing the realtime total organic carbon and the realtime parameters. The estimator is further configured to compare the present state of the water purification system with an expected state of the water purification system. The control system further includes a predictor operatively associated with the estimator, and configured to predict an event for execution by the water purification system to reach the expected state of the water purification system. The water purification system further includes a supervisory control unit operatively coupled to the predictor and the water purification system, and is configured to facilitate execution of the predicted event by the water purification system.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
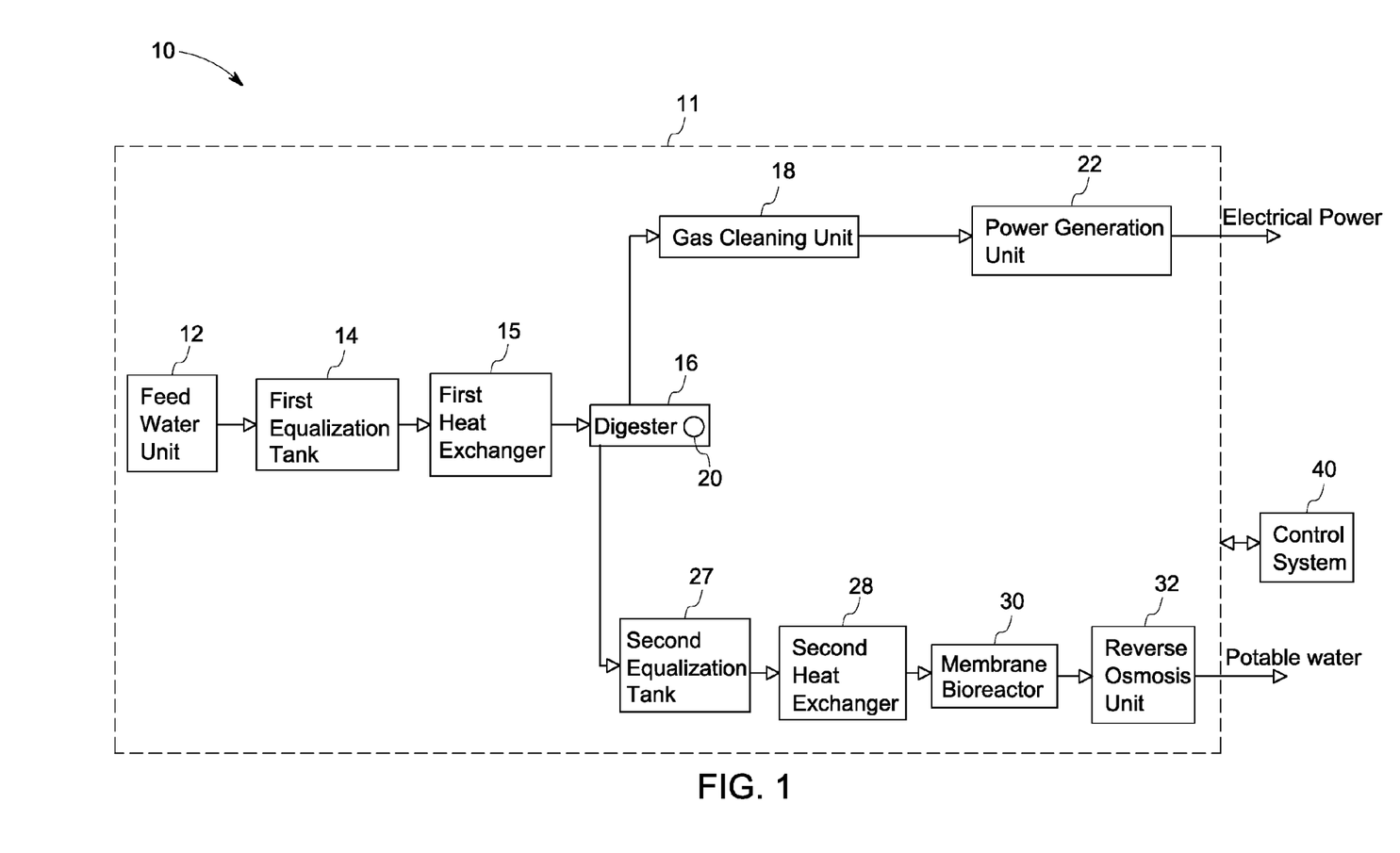
FIG. 1 is a diagrammatical view of an exemplary system for monitoring and controlling an integrated system, in accordance with aspects of the present technique.

FIG. 1 is a diagrammatical view of an exemplary system 10 for monitoring and controlling an integrated system 11, in accordance with aspects of the present technique. As illustrated in FIG. 1, the integrated system 11 includes a water purification system with capabilities of recovering purified water and valuable energy. In accordance with aspects of the present technique, the water purification system 11 may include components, such as, a feed water unit 12, a first equalization tank 14, a first heat exchanger 15, a digester 16, a second equalization tank 27, a second heat exchanger 28, a membrane bioreactor 30, a reverse osmosis unit 32, a gas cleaning unit 18 and a power generation unit 22, or combinations thereof. Although the present technique is described with reference to the water purification system, it may have application in other systems.

In accordance with further aspects of the present technique, the system 10 may also include a control system 40 configured to monitor and control the integrated system 11. As illustrated in FIG. 1, the control system 40 is operatively associated with the integrated system 11. The monitoring and control of the integrated system 11 via the control system 40 enables continuous and consistent optimal operation of the integrated system 11.

Furthermore, the feed water unit 12 is in operative association with the first equalization tank 14. As shown in FIG. 1, the first equalization tank 14 is in operative association with the first heat exchanger 15 and the digester 16 is operatively coupled to the first heat exchanger 15. The feed water unit 12 intakes impure wastewater, and transfers the impure wastewater to the first equalization tank 14. The first equalization tank 14 may be configured to absorb variations in the amounts of impure wastewater. The impure wastewater from the first equalization tank 14 may then be transferred to the first heat exchanger 15. In one embodiment, the first heat exchanger 15 regulates temperature of the impure wastewater to a predetermined temperature for an optimized working of the digester 16. It may be noted that the first heat exchanger 15 may include a shell and tube heat exchanger, a regenerative heat exchanger, an adiabatic wheel heat exchanger, a plate fin heat exchanger, a fluid heat exchanger, a dynamic scraped surface heat exchanger, a phase-change heat exchanger, a multi-phase heat exchanger, or a spiral heat exchanger, for example.

Moreover, subsequent to the impure wastewater temperature regulation in the first heat exchanger 15 the impure wastewater is transferred to the digester 16. In one embodiment, the digester 16 may include an anaerobic digester. In an alternative embodiment, the digester 16 may include an aerobic digester.

In addition, as depicted in FIG. 1, the digester 16 may include a sensing device 20 for sensing a total organic carbon (TOC) and realtime parameters of the impure wastewater received from the first heat exchanger 15. In the presently contemplated embodiment, the digester 16 is shown as including the sensing device 20. However, in other embodiments, the sensing device 20 may be incorporated in one or more of the components of FIG. 1. In certain embodiments, the sensing device 20 may include a gas flow meter, a calorimeter, one or more hard sensors, and one or more soft sensors. As used herein, the term "realtime parameters" may include parameters associated with the water and determined in realtime. Further, as used herein, the term "parameters" refers to measurable quantities and/or properties of the water that define purity of water. The realtime parameters, for example, including others may include pH, TOC, bacterial concentration, microbial concentration, substrate concentration, temperature, biogas composition, alkalinity, hardness, amount of chlorides and phosphates, realtime color of feed stream, density of feed stream, and biogas quantity.

In one embodiment, the digester 16 may extract substantial amounts of chemical oxygen demand (COD) from the impure wastewater received from the first heat exchanger 15. Following the extraction of COD from the impure wastewater, the digester 16 generates a COD cleared water and releases biogas. Subsequently, the biogas is transferred to the gas cleaning unit 18 that cleans the biogas of impurities resulting in a purified biogas. The impurities, for example, may include gases other than biogas, such as $H_2S$. The gas cleaning unit 18 then transfers the purified biogas to the power generation unit 22 that generates electrical power utilizing the purified biogas. In certain embodiments, the power generation unit 22 may include a reciprocating gas engine. In yet another embodiment, the power generation unit 22 may include a GE Jenbacher engine. Further, the electrical power generated by the power generation unit 22 may be utilized for operation of the integrated system 11. Also, in other embodiments, the electrical power may be utilized for operation of other industrial plants.

Subsequent to the generation of the COD cleared water, variations in amount of the COD cleared water may be absorbed by the second equalization tank 27. In one embodiment, the second equalization tank 27 may include a total suspended solids (TSS) removal system (not shown). In still another embodiment, the TSS removal system may include entrapped air floatation system (EAF), dissolved air floatation system (DAF), belt press, screw press, or similar devices.

Furthermore, temperature of the COD cleared water may be regulated in the second heat exchanger 28. Consequent to the regulation of temperature of the COD cleared water, a temperature regulated COD cleared water may be generated. The second heat exchanger 28, for example, may include a shell and tube heat exchanger, a regenerative heat exchanger, an adiabatic wheel heat exchanger, a plate fin heat exchanger, a fluid heat exchanger, a dynamic scraped surface heat exchanger, a phase-change heat exchanger, a multi-phase heat exchanger, or a spiral heat exchanger.

In addition, the temperature regulated COD cleared water is transferred to the membrane bioreactor 30 that is in operative association with the second heat exchanger 28. The membrane bioreactor 30 facilitates removal of any remaining COD from the temperature regulated COD cleared water received from the second heat exchanger 28. The membrane bioreactor 30 also facilitates removal of substantial amounts of suspended impurities from the temperature regulated COD cleared water. Consequent to the removal of the remaining COD and suspended solids by the membrane bioreactor 30, an effluent is produced.

Further, the effluent is transferred to the reverse osmosis unit 32 that is in an operative association with the membrane bioreactor 30. The reverse osmosis unit 32 removes soluble organics and total dissolved solids (TDS) from the effluent. Consequent to the removal of the soluble organics and the TDS from the effluent, potable water is generated.

Figure 2:
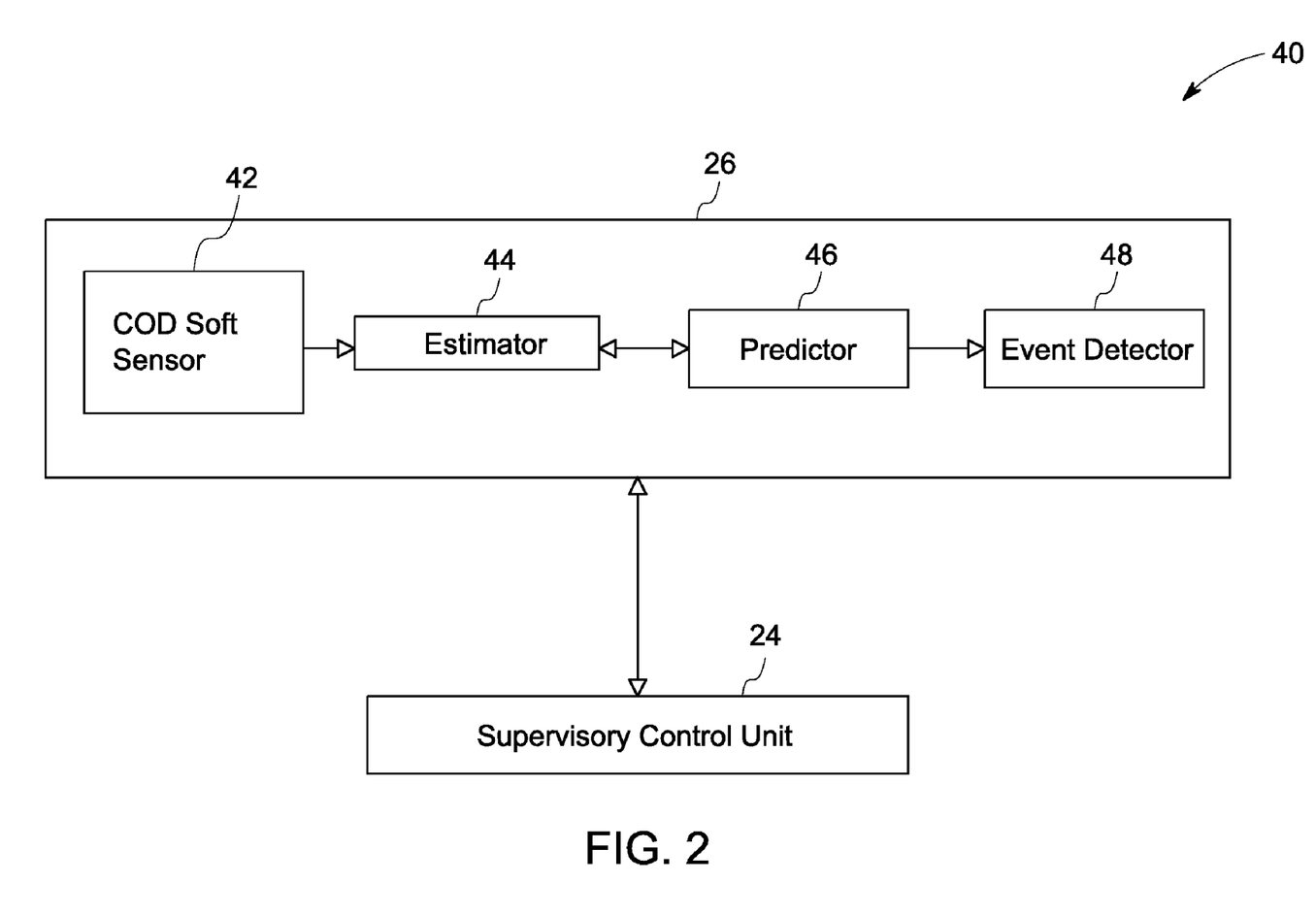
FIG. 2 is a diagrammatical view illustrating an exemplary control system for use with a device, in accordance with aspects of the present technique.

FIG. 2 is a diagrammatical view illustrating one embodiment of the exemplary control system 40 for use with a device, in accordance with aspects of the present technique. As illustrated with reference to FIG. 1, the control system 40 may be configured to monitor and control the device for optimized and efficient working of the device. In one embodiment, the device may include the integrated system 11 (see FIG. 1). However, in other embodiments, the device may include the digester 16 (see FIG. 1), the membrane bioreactor 30 (see FIG. 1), the first equalization tank 14 (see FIG. 1), the first heat exchanger 15 (see FIG. 1), the second equalization tank 27 (see FIG. 1), the second heat exchanger 28 (see FIG. 1), the power generation unit 22 (see FIG. 1), or combinations thereof.

In accordance with a presently contemplated configuration, the control system 40 may include a supervisory control unit 24 and a control model 26. Furthermore, as depicted in FIG. 2, the control model 26 may include a chemical oxygen demand soft sensor 42, an estimator 44, a predictor 46 and an event detector 48.

The COD soft sensor 42 is in operational communication with the estimator 44. The COD soft sensor 42 may be configured to determine a realtime COD corresponding to a realtime total organic carbon (TOC) of a feed stream to the device. In one embodiment, the realtime TOC may be determined by the sensing device 20 (see FIG. 1). Furthermore, the COD soft sensor 42 may be configured to determine the realtime COD utilizing a COD model.

In accordance with aspects of the present technique, the COD model may be built by mapping offline TOCs and color of the feed stream to corresponding offline CODs to determine a relationship between the offline TOCs and the realtime color of the feed stream and the corresponding offline CODs. In one embodiment, the offline CODs and the offline TOCs may be determined by using COD laboratory tests and TOC laboratory tests, respectively. In certain embodiments, the color of the feed stream may be determined by the sensing device 20 (see FIG. 1). The sensing device 20 for determining the color of the feed stream, for example, may include the calorimeter. Also, in one embodiment, the relationship between the offline TOCs and the color of the feed stream to the corresponding offline CODs is determined by using artificial intelligence.

In addition, the estimator 44 of the control model 26 may be configured to determine system parameters utilizing the realtime parameters, the realtime COD, offline parameters and predetermined parameters. The system parameters, for example, may include bacterial concentration, substrate concentration, microbial concentration, device COD, volatile fatty acids concentration, alkalinity, device TOC, hardness, ammonia concentration, phosphates concentrations, sulphates concentrations, biogas composition, device pH, or combinations thereof. As used herein, the term "predetermined parameters" may be used to refer to parameters associated with the feed stream of the device while the device operates in a steady state condition. More particularly, the term "predetermined parameters" may be used to refer to the parameters of the feed stream of the device when the device operates in an optimized condition. In other words, the term "predetermined parameters" may be representative of steady state parameters of the device. Further, as used herein, the term "offline parameters" may be representative of the parameters that are determined offline. Also, the offline parameters may be determined by utilizing laboratory tests. The offline parameters, for example, may include pH, the TOC, the COD, bacterial concentration (MLSS), substrate concentration, microbial concentration, nitrogen, phosphates concentration, sulphates concentration, temperature, biogas composition, alkalinity, hardness, amount of chlorides and, biogas quantity.

With continuing reference to FIG. 2, the estimator 44 may be further configured to determine a present state of the device and compare the present state of the device with an expected state of the device. In one embodiment, the estimator 44 determines the present state of the device using the system parameters. As used herein, the term "present state of the device" may be used to refer to an operating condition of the device. Further, the term "expected state of the device" may be used to refer to a steady state operating condition of the device while the device operates in an optimized condition. In other words, the term "expected state of the device" may be used to refer to a state of the device when the system parameters are substantially similar to the predetermined parameters.

Further, as illustrated in the presently contemplated embodiment, the predictor 46 is operatively coupled to the estimator 44, and is configured to predict an event to be executed by the device to enable the device to reach a subsequent state of the device. The predicted event may include changes, variations or adjustments in concentrations, for example, change in pH, change in biomass concentration, change in alkalinity, change in inorganic carbon, change in nitrogen and phosphorous levels, change in hydrogen concentration, or combinations thereof.

In addition, the event detector 48 is shown as being in operative association with the predictor 46 and the supervisory control unit 24. In one embodiment, the event detector 48 is configured to determine the subsequent state of the device after execution of the predicted event. In still another embodiment, the event detector 48 may be configured to determine a corrective action for the device when the subsequent state of the device is different from the expected state of the device. The corrective action, for example, may include change in input feed rate, change in COD concentration, change in temperature, change in redox potential, change in nutrient addition, chemicals, addition, reseeding, and bioaugmentation. Consequent to the determination of the corrective action, the supervisory control unit 24 corrects the estimator 44 and the predictor 46. In certain embodiments, the supervisory control unit 24 corrects the predictor 46 and the estimator 44 by changing a state of the estimator 44 and the predictor 46. In one embodiment, the state of the predictor 46 and the estimator 44 may be changed by determining the offline parameters, and updating the predictor 44 and the estimator 46 utilizing the offline parameters.

Figure 3:
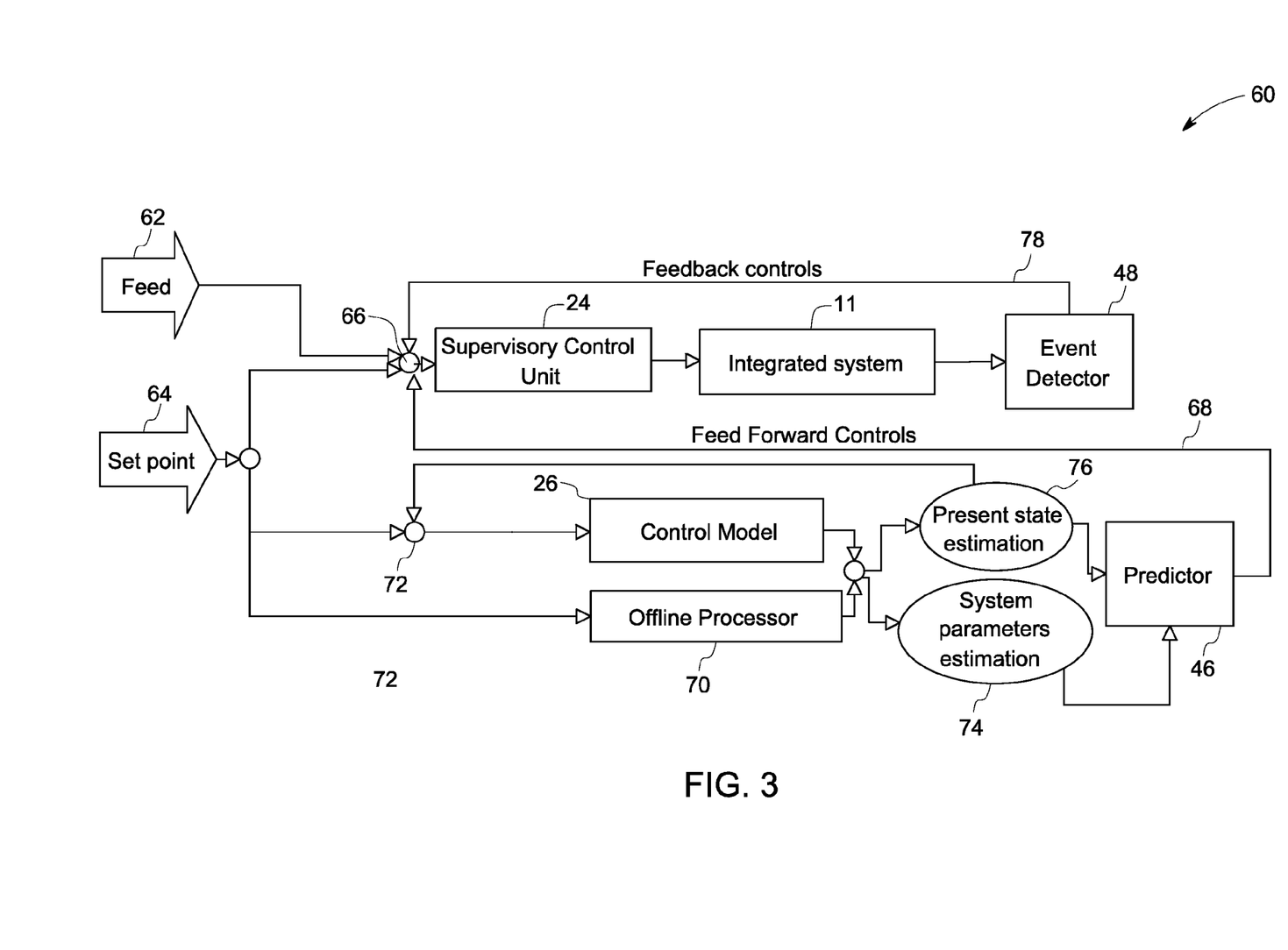
FIG. 3 is a control diagram for monitoring and controlling the integrated system of FIG. 1, in accordance with aspects of the present technique.

Turning now to FIG. 3, a control diagram 60 for monitoring and controlling an integrated system, such as, the integrated system 11 of FIG. 1, is illustrated. In a presently contemplated embodiment, reference numeral 62 is representative of feed. In certain embodiments, the feed 62 is similar to the realtime parameters. Further, reference numeral 64 is representative of a set point. In one embodiment, the set point 64 may be representative of the predetermined parameters. Moreover, a first logic 66 receives as input feedback controls 78, the set point 64, feed forward controls 68, and the feed 62 to determine optimizing controls. The optimizing controls may be implemented by the supervisory control unit 24 on the integrated system 11 to enable optimized working of the integrated system 11.

Further, as illustrated in FIG. 3, the event detector 48 is in operational communication with the integrated system 11. The event detector 48 may determine the subsequent state of the integrated system 11 after implementation of the optimizing controls. In one embodiment, the subsequent state of the integrated system 11 may be representative of the feedback controls 78. In other words, the feedback controls 78 may include subsequent state controls that define the subsequent state of the integrated system 11 that is achieved after implementation of the optimizing controls by the supervisory control unit 24 on the integrated system 11. In certain embodiments, the optimizing controls may be representative of the predicted event. In still another embodiment, the corrective action may be representative of the feedback controls 78.

With continuing reference to FIG. 3, a second logic 72 may be configured to receive the feed forward controls 68 and the set point 64. The second logic 72 transfers the feed forward controls 68 and the set point 64 to the control model 26. Subsequently, an offline analysis may be conducted by an offline processor 70 to determine the offline parameters. As illustrated in FIG. 3, the control model 26 may determine the system parameters at step 74 and the present state of the integrated system 11 at step 76.

Furthermore, the predictor 46 utilizes the system parameters and the present state of the integrated system 11 for determination of the predicted event. In certain embodiments, the predicted event may be representative of the feed forward controls 68.

Figure 4:
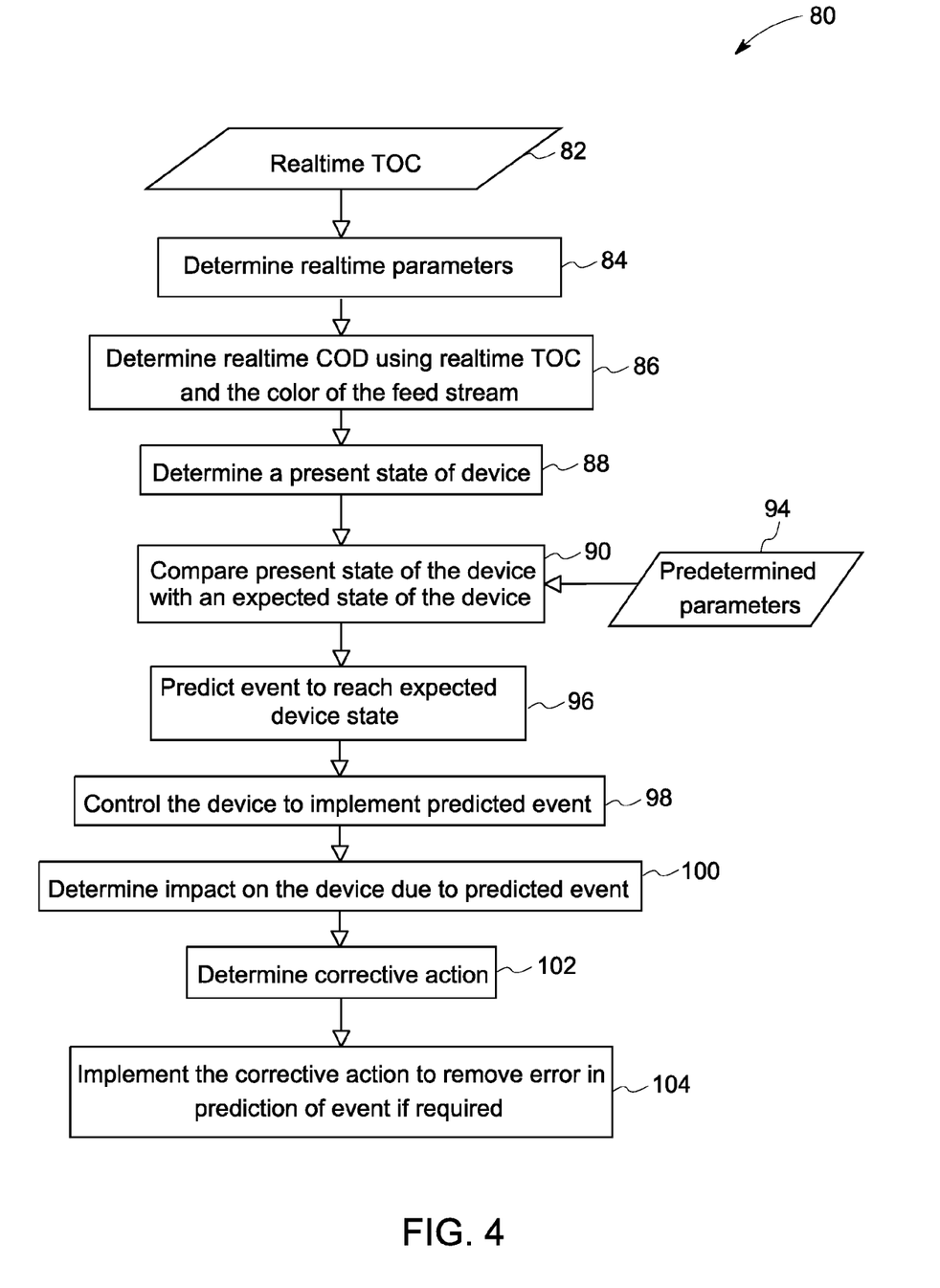
FIG. 4 is a flow chart illustrating an exemplary method for monitoring and controlling the device, in accordance with aspects of the present technique.

FIG. 4 is a flow chart 80 illustrating an exemplary method for monitoring and controlling a device, such as integrated system 11 (see FIG. 1), in accordance with aspects of the present technique. Reference numeral 82 may be representative of the realtime TOC. The realtime TOC may be determined by utilizing the sensing device 20 (see FIG. 1). The method starts at step 84, where the realtime parameters may be determined using the sensing device 20 (see FIG. 1). Further, at step 86, the realtime COD may be determined corresponding to the realtime TOC 82 and colors of the feed stream. As illustrated with reference to FIG. 1, the colors of the feed stream may be one of the realtime parameters, and thus, may be determined by the sensing device 20 (see FIG. 1). The determination of the realtime COD corresponding the realtime TOC and the colors of the feed stream may be better understood with reference to FIG. 5.

Figure 5:
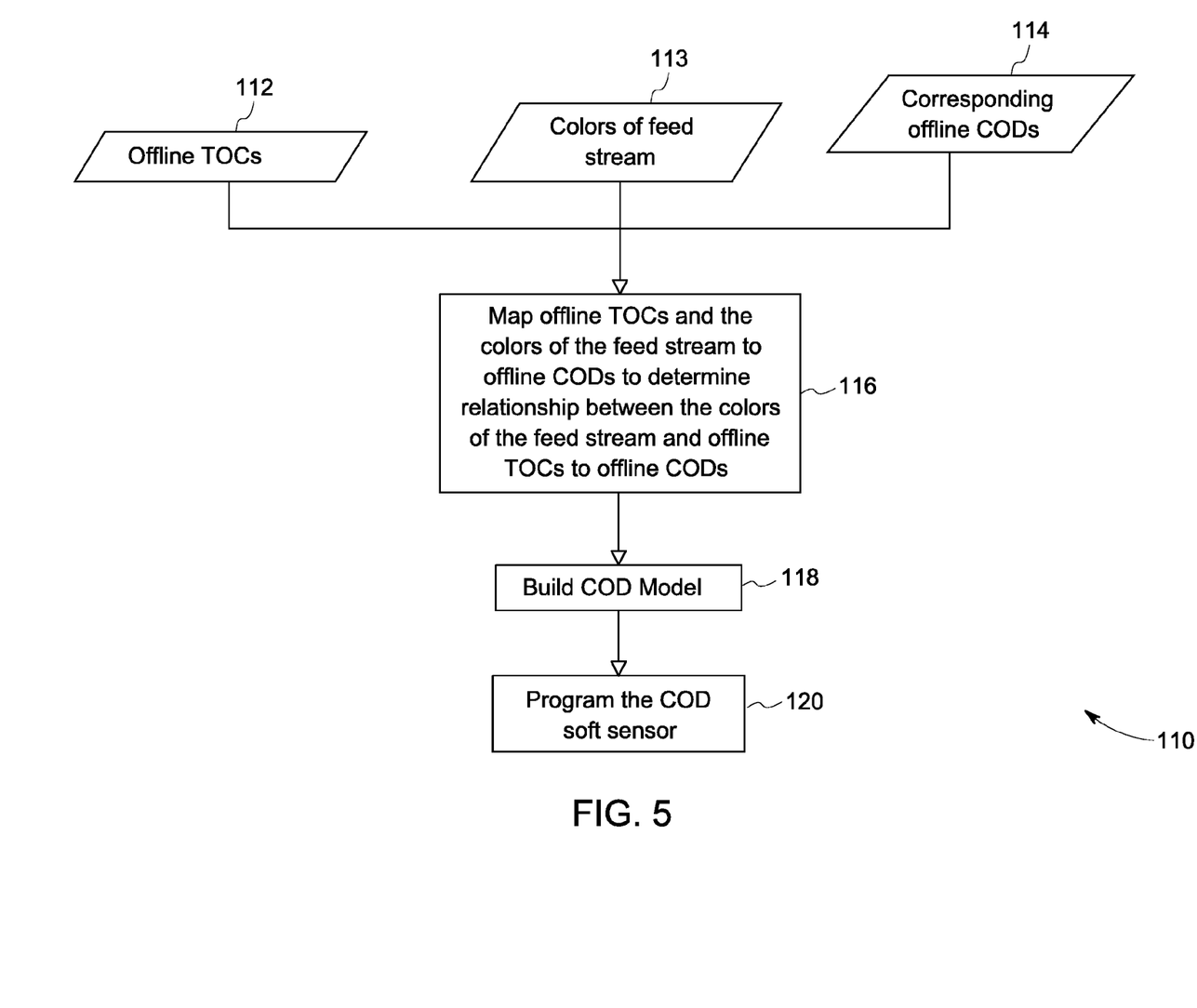
FIG. 5 is a flow chart illustrating an exemplary method of programming a soft sensor by building a chemical oxygen demand (COD) model, in accordance with aspects of the present technique.

Turning now to FIG. 5, a flow chart 110 illustrating an exemplary method of programming a soft sensor, such as the COD soft sensor 42 (see FIG. 2), by building a chemical oxygen demand model, in accordance with aspects of the present technique is depicted. Reference numeral 112 may be representative of offline TOCs, while the colors of the feed stream may be represented by reference numeral 113. Further, reference numeral 114 may be representative of corresponding offline CODs. The method starts at step 116, where the offline TOCs 112 and the colors of the feed stream 113 are mapped to the corresponding offline CODs. Consequent to the mapping at step 116, a relationship between the offline TOCs 112 and the colors of the feed stream 113 to the corresponding offline CODs 114 is established. In one embodiment, the relationship may be determined using artificial intelligence on the offline TOCs 112 and the colors of the feed stream 113 and the corresponding offline CODs 114.

With continuing reference to FIG. 5, the relationship between the offline TOCs 112 and the colors of the feed stream 113 and the corresponding offline CODs 114 is used to build a COD model as indicated by step 118. As used herein, the term "COD model" may be used to refer to a model capable of determining a realtime COD corresponding the realtime TOC.

Subsequent to the building of the COD model, the COD soft sensor 42 may be programmed utilizing the COD model, as depicted in step 120. The COD soft sensor 42 may be used to determine the realtime CODs corresponding to the realtime TOCs and the colors of the feed stream. In one embodiment, the realtime TOCs may be determined by the sensing device 20 (see FIG. 1). As previously noted with reference to FIG. 1, the color of the feed stream may be determined by the calorimeter.

With returning reference to FIG. 4, at step 88, a present state of the device is determined. As previously noted with reference to FIG. 2, the estimator 44 determines the present state of the device. The determination of the present state of the device may be better understood with reference to FIG. 6.

Figure 6:
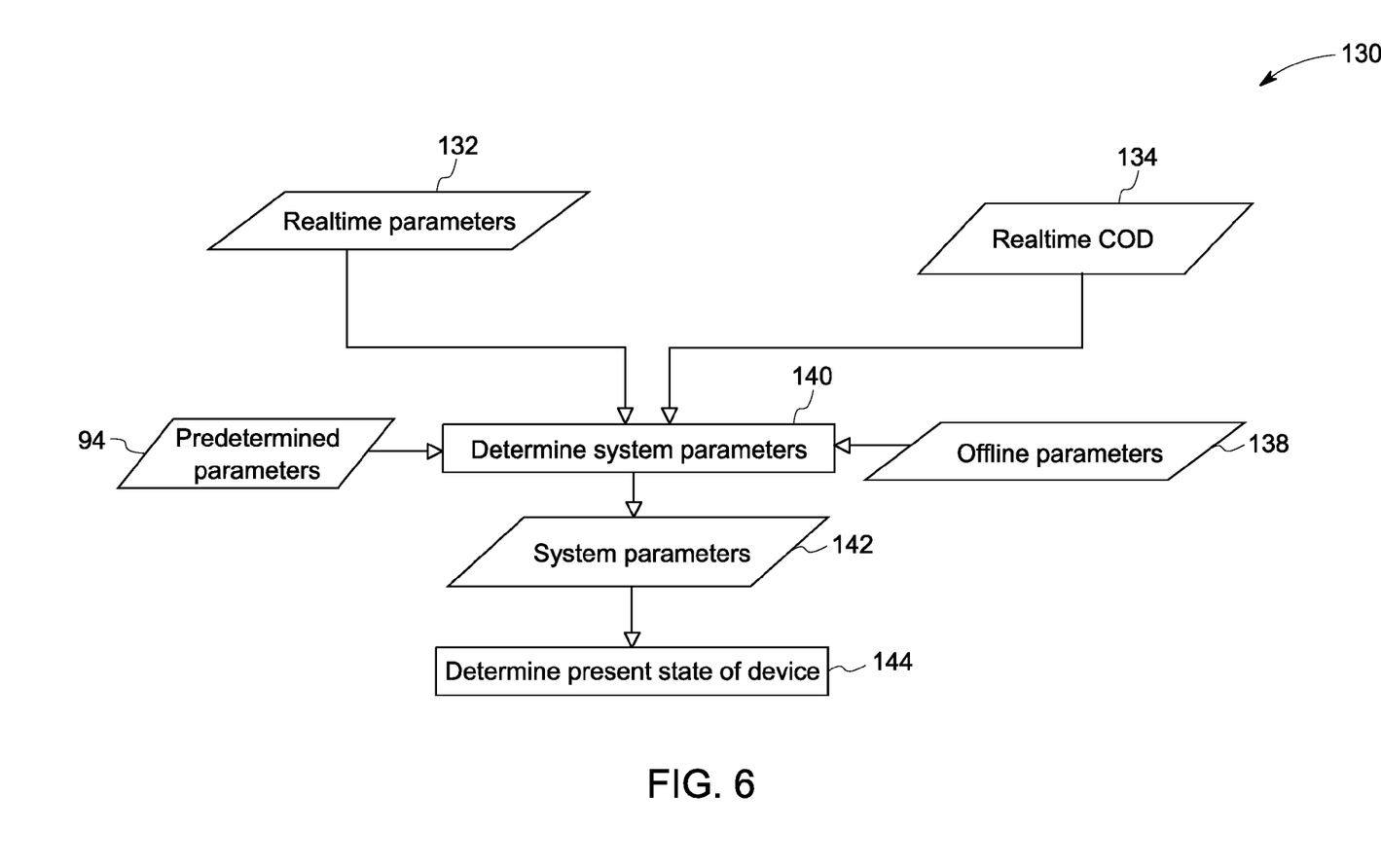
FIG. 6 is a flow chart illustrating a method for determining a present state of a device utilizing system parameters, in accordance with aspects of the present technique.

Referring now to FIG. 6, a flow chart 130 illustrating a method for determining a present state of a device utilizing system parameters, in accordance with aspects of the present technique, is depicted. Reference numeral 132 may be representative of realtime parameters, while reference numeral 94 may be representative of predetermined parameters (see FIG. 4). Also, reference numeral 138 may be representative of offline parameters, while reference numeral 134 may be representative of realtime COD 134. The method starts at step 140, where system parameters may be determined utilizing the realtime parameters 132, the offline parameters 138, the predetermined parameters 94, and the realtime COD 134. As previously noted with reference to FIG. 2, the system parameters may be determined by the estimator 44. The system parameters may generally be represented by reference numeral 142.

In certain embodiments, the estimator 44 may determine the system parameters 142 by application of mathematical formulas. In accordance with exemplary aspects of the present technique, equations (1) to (3) represent determination of the system parameters 142 by application of formulas.

In one embodiment, when the feed stream concentration and the bacterial concentration of an acidogenic phase is represented by $X_1$ and $X_2$ respectively, the microbial concentration and the substrate concentration of a methanogenic phase is represented by $X_3$ and $X_4$ respectively, the alkalinity, inorganic carbon and ammonia concentrations are represented by $X_5$, $X_7$ and $X_8$ respectively, then a change in concentrations of $X_1$, $X_2$, $X_3$, $X_4$, $X_5$, $X_7$ and $X_8$ may be represented by control affine equation (1) as:

$$\dot{X} = f(X) + g(X) \cdot u \quad (1)$$

where $\dot{X}$ is a change in concentrations vector and X may be represented by $X=[X_1, X_2, X_3, X_4, X_5, X_6, X_7]^T$. Also, in equation (1) u may be determined by utilizing equation (2) as follows:

$$u = [D, X_{1,in}, T, pH_{in}, X_{5,in}, X_{8,in}]^T \quad (2)$$

where u is a vector of all the parameters that affect the device, D is the dilution rate, which is a ratio of the feed stream flowrate to the volume of the device, and T is the temperature of the device. Further, in equation (2) subscript in is indicative of realtime parameters, offline parameters and/or predetermined parameters of the feed stream.

Further, the system parameters 142 may be determined by equation (3) as follows:

$$Y = f(X) \quad (3)$$

where Y may be representative of the system parameters. Further, if the predetermined parameters 94 are represented by $\hat{Y}$, then drift in prediction of the event may be determined as a difference of Y and $\hat{Y}$.

Consequent to the determination of the system parameters 142, the present state of the device may be determined at step 144. As previously noted with reference to FIG. 2, the present state of the device may be determined by the estimator 44.

With returning reference to FIG. 4, at step 90, the present state of the device determined at step 88 is compared with the expected state of the device. Further, the comparison of the present state of the device with the expected state of the device enables determination of a difference between the present state of the device and the expected state of the device. In one embodiment, the expected state of the device may be determined by determining the predetermined parameters 94 (see FIG. 6).

Consequent to the determination of the difference between the present state of the device and the expected state of the device, an event is predicted at step 96, where the predicted event may enable the device to reach the expected state. As illustrated with reference to FIG. 2, the event is predicted by the predictor 46. In one embodiment, the predictor 46 predicts the event such that implementation of the predicted event enables optimized working of the device. More particularly, the implementation of the predicted event enables the device to reach the expected state of the device. The predicted event, for example, may include heating or cooling of an input feed, addition of chemicals, increase or decrease in acidogenic bacterial concentration, increase or decrease in methanogenic bacterial concentration, increase or decrease in bacterial activity, fixing one or more components of the device, increase or decrease in oxygen content of the input feed, or combinations thereof, as previously noted.

In one embodiment, the device may be controlled to implement the predicted event as indicated by step 98. As previously noted with reference to FIG. 2, the supervisory control unit 24 controls the device to implement the predicted event. More particularly, the supervisory control unit 24 may be configured to control the device to implement the predicted event to enable the device reach the expected state.

Further, at step 100, an impact of the implementation of the predicted event is determined. In one embodiment, the impact of the predicted event is determined by determining the subsequent state (see FIG. 2) of the device after implementation of the predicted event. As illustrated with reference to FIG. 2, the event detector 48 (see FIG. 2) determines the subsequent state of the device.

Consequent to the determination of the impact of the implementation of the predicted event, corrective action to minimize any error in the prediction of the event may be determined at step 102. Further, as previously noted with reference to FIG. 2, the event detector 48 may be configured to determine the corrective action. In one embodiment, the corrective action may be determined when there is a need for corrective action. Determination of the need of the corrective action may be better understood with reference to FIG. 7.

Figure 7:
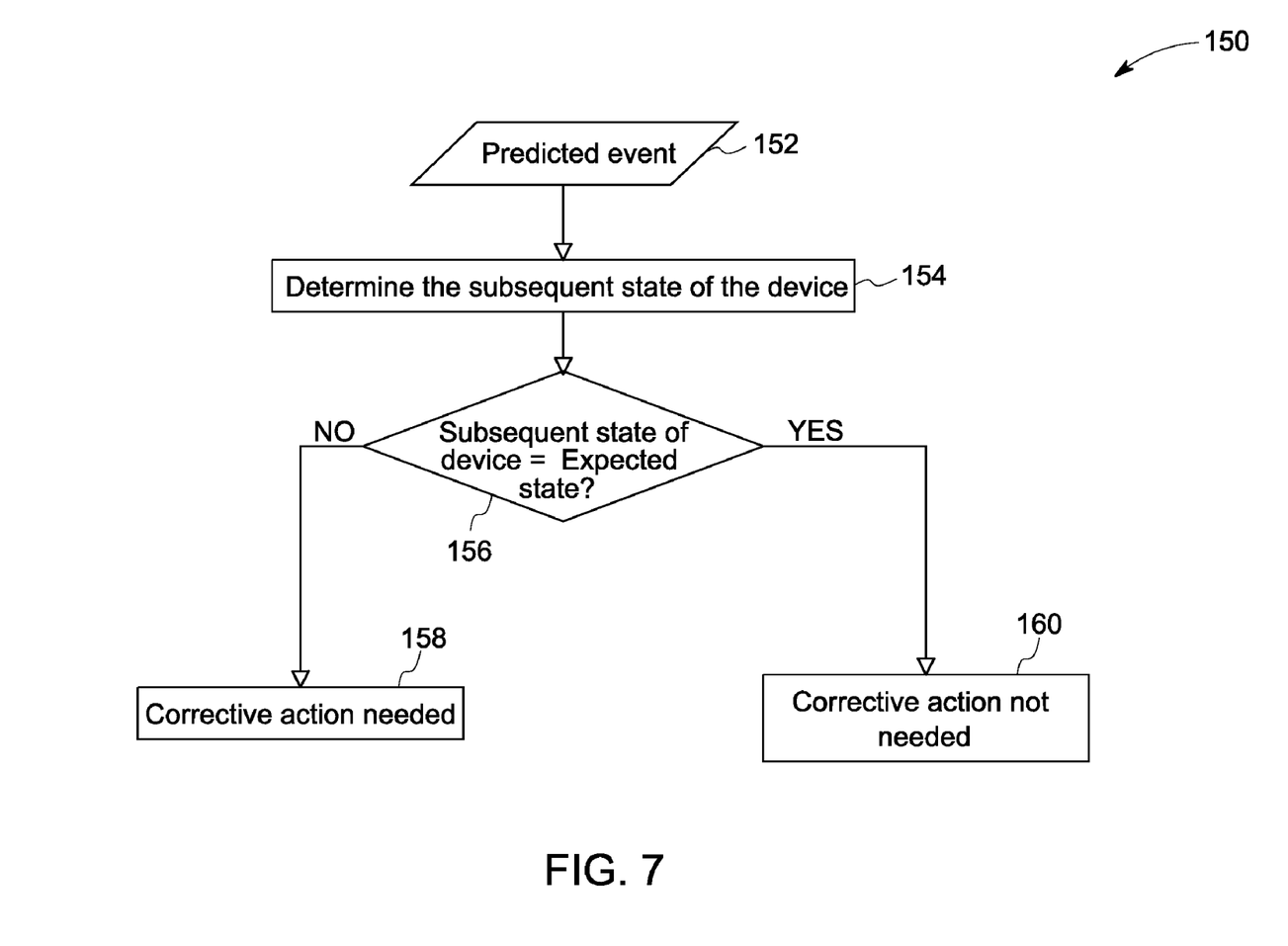
FIG. 7 is a flowchart illustrating a method for determining need for a corrective action, in accordance with aspects of the present technique.

FIG. 7 is a flowchart 150 illustrating a method for determining a need for a corrective action, in accordance with aspects of the present technique. Reference numeral 152 is representative of a predicted event. By way of example, reference numeral 152 may be representative of the predicted event generated at step 96 (see FIG. 4). The method starts at step 154 where a subsequent state of the device is determined. Further to the determination of the subsequent state, a check may be carried out at step 156 to determine whether the subsequent state of the device is similar to the expected state of the device. At step 156, if it is verified that the subsequent state of the device is substantially similar to the expected state of the device, then it may be concluded that no corrective action is necessary as indicated by reference numeral 160. However, at step 156, if it is verified that the subsequent state of the device is different from the expected state of the device, then it may be concluded that corrective action may be desired, as indicated by the reference numeral 158. As previously noted with reference to FIG. 2, the event detector 48 may be configured to determine the corrective action.

With returning reference to FIG. 4, consequent to processing by step 102, if it is determined that corrective action is desired then the corrective action may be implemented to minimize any error in the prediction of the event, as depicted by step 104. As previously noted, the corrective action is implemented by the supervisory control unit 24 (see FIG. 2) to minimize an error in the prediction of the event. In one embodiment, the supervisory control unit 24 implements the corrective action on the estimator 44 (see FIG. 2) and the predictor 46 (see FIG. 2), when there is a need for the corrective action.

By applying the described technique hereinabove, significant variations and disturbances in a device may be determined well in advance, and subsequent actions may be taken to prevent the system from stress. Thus, the present technique provides a realtime monitoring and controlling system for optimized working of the system and prevents the system from shutdowns. Further, the illustrated technique improves reliability of the device and reduces number of shutdowns of the device.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A control system, comprising:
a soft sensor configured to determine realtime chemical oxygen demand from realtime total organic carbon utilizing a chemical oxygen demand model;
an estimator configured to:
determine system parameters utilizing the realtime chemical oxygen demand;
determine a present state of a device based upon the system parameters;
a predictor operatively coupled to the estimator, and configured to predict an event for execution by the device to reach the expected state of the device; and
a supervisory control unit operatively coupled to the predictor and the device, and configured to facilitate execution of the predicted event by the device.

2. The system of claim 1, wherein the device comprises a digester, a membrane bioreactor, a heat exchanger, a gas engine, an integrated system, or combinations thereof.

3. The system of claim 1, further comprising one or more sensors configured to determine realtime parameters and realtime total organic carbon of a feed stream to the device.

4. The system of claim 1, wherein the chemical oxygen demand model is built by mapping offline total organic carbon and colors of the feed stream to corresponding offline chemical oxygen demand to determine a relationship between the offline total organic carbon and the corresponding offline chemical oxygen demand, wherein the colors of the feed stream is the realtime parameter.

5. The system of claim 1, wherein the estimator is configured to determine system parameters utilizing the realtime parameters, offline parameters and predetermined parameters, wherein the predetermined parameters are representative of steady state parameters of the device, and offline parameters are representative of parameters of the device determined offline.

6. The system of claim 1, wherein the predicted event comprises change in pH of the device, change in biomass concentration, change in alkalinity, change in inorganic carbon, change in nitrogen and phosphorous levels, change in hydrogen concentration, or combinations thereof.

7. The system of claim 1, further comprising an event detector operatively coupled to the supervisory control unit and the predictor.

8. The system of claim 7, wherein the event detector is configured to determine a subsequent state of the device after execution of the predicted event.

9. The system of claim 8, wherein the event detector is configured to determine a corrective action if the subsequent state of the device is different from the expected state of the device.

10. The system of claim 9, wherein the event detector is configured to communicate the corrective action to the supervisory control unit.

11. The system of claim 10, wherein the supervisory control unit is configured to correct the predictor and the estimator by enforcing the corrective action.

12. The system of claim 9, wherein the corrective action comprises change in input feed rate, change in COD concentration, change in temperature, change in redox potential, change in nutrient addition, chemicals, addition, reseeding, and bioaugmentation.

13. A control system for monitoring and controlling a digester, comprising:
a soft sensor configured to determine realtime chemical oxygen demand from realtime total organic carbon utilizing a chemical oxygen demand model;
an estimator configured to:
determine system parameters utilizing the realtime chemical oxygen demand;
determine a present state of the digester based upon the system parameters;
compare the present state of the digester with an expected state of the digester;
a predictor operatively coupled to the estimator, and configured to predict an event for execution by the digester to reach the expected state of the digester; and
a supervisory control unit operatively coupled to the predictor and the digester, and configured to facilitate execution of the predicted event by the digester.

14. A system, comprising:
a water purification system, comprising:
a digester configured to extract substantial amounts of chemical oxygen demand from impure wastewater to generate chemical oxygen demand cleared water;
one or more sensing devices operatively associated with the digester, and configured to sense realtime total organic carbon and realtime parameters of a feed to the digester;
a membrane bioreactor operatively associated with the digester, and configured to generate an effluent by removal of substantial amounts of suspended impurities and any remaining chemical oxygen demand from the chemical oxygen demand cleared water;
a reverse osmosis unit operatively associated with the membrane bioreactor, and configured to remove soluble organics and total dissolved solids from the effluent;
a control system in operative association with the water purification system, wherein the control system comprises:
an estimator configured to:
a soft sensor configured to determine realtime chemical oxygen demand from realtime total organic carbon utilizing a chemical oxygen demand model;
determine a present state of the water purification system utilizing the realtime chemical oxygen demand, the realtime total organic carbon and the realtime parameters;
compare the present state of the water purification system with an expected state of the water purification system;
a predictor operatively associated with the estimator, and configured to predict an event for execution by the water purification system to reach the expected state of the water purification system; and
a supervisory control unit operatively coupled to the predictor and the water purification system, and configured to facilitate execution of the predicted event by the water purification system.

15. The system of claim 14, wherein the water purification system further comprises one or more heat exchangers configured to regulate temperature of a feed stream to the membrane bioreactor, the digester, the reverse osmosis unit, or combinations thereof.

16. The system of claim 14, wherein the water purification system further comprises one or more equalization tanks configured to absorb variations in the feed stream.

\* \* \* \* \*